United States Patent [19]
Crimmins

[11] Patent Number: 5,351,149
[45] Date of Patent: Sep. 27, 1994

[54] ASK OPTICAL TRANSMITTER

[75] Inventor: James W. Crimmins, Wilton, Conn.

[73] Assignee: K and M Electronics, Inc., West Springfield, Mass.

[21] Appl. No.: 36,993

[22] Filed: Mar. 25, 1993

[51] Int. Cl.$^5$ .............................. H04B 10/04
[52] U.S. Cl. ........................ 359/181; 359/184; 375/24; 332/116
[58] Field of Search ............... 359/180, 181, 184, 158, 359/128; 375/24, 41, 59; 332/115, 116

[56] References Cited

U.S. PATENT DOCUMENTS 3,846,705 11/1974 Davis .................................. 332/115

OTHER PUBLICATIONS

Kowano et al. "100 ps Frequency Switching Without Bit Loss for a 10 Gb/S ASK Modulated Signal" IEEE Photonics Technology Letters, vol. 5, No. 3, Mar. 1993, pp. 354–356.

Primary Examiner—Richard E. Chilcot, Jr.
Assistant Examiner—Kinfe-Michael Negash
Attorney, Agent, or Firm—St. Onge Steward Johnston & Reens

[57] ABSTRACT

An amplitude-shift-keyed (ASK) optical transmitter is described for generating an ASK modulated infrared signal from a light-emitting-diode (LED). The transmitter includes a DC powered microcircuit for generating an ASK modulation signal. A pair of mosfet devices are connected in series with one or more LED's between the mosfets. An oscillator signal used to operate the microcircuit is also employed as a carrier signal to activate one mosfet while the ASK modulating signal is coupled to operate the other mosfet. Input capacitances of the mosfets are used to tune the oscillator signal and smooth the leading and trailing edges of the ASK modulation signal. Several embodiments are described.

15 Claims, 1 Drawing Sheet

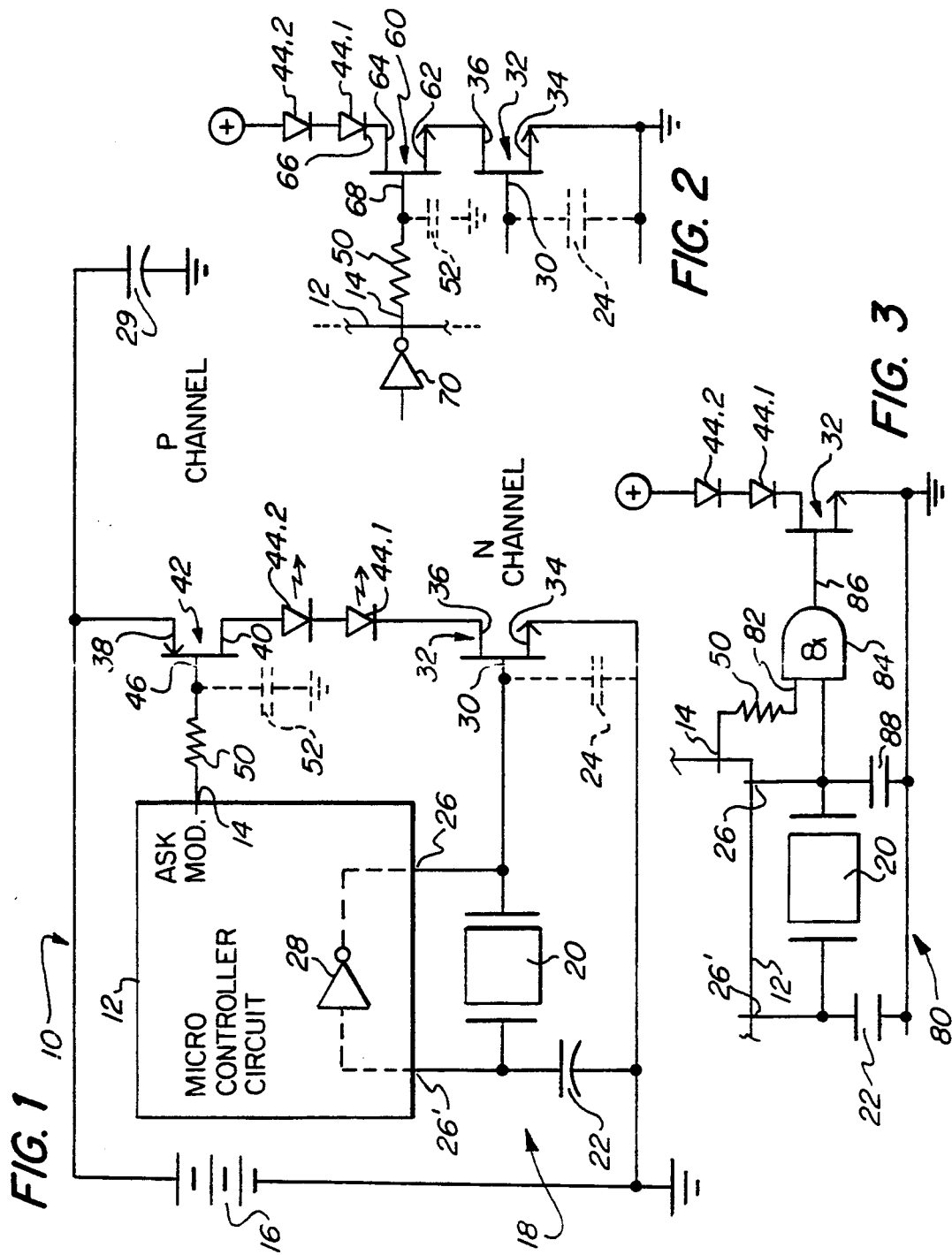

5,351,149

ASK OPTICAL TRANSMITTER

FIELD OF THE INVENTION

This invention relates to an optical transmitter generally and more specifically to an amplitude-shift-keyed (ASK) optical transmitter.

BACKGROUND OF THE INVENTION

Amplitude shift keyed transmitters are generally well known. See for example, U.S. Pat. Nos. 5,077,728, 5,017,885, and 5,016,246. The described ASK techniques may apply to rf or optical communications using infrared wavelengths. The generation of an ASK modulation technique typically involves assigning a one or zero to the presence of a carrier signal and the opposite binary value to the absence of the carrier signal.

SUMMARY OF THE INVENTION

With an ASK optical transmitter in accordance with the invention, a significant simplification can be achieved by using an oscillator required to operate an associated microcircuit also as a carrier signal. An ASK modulation signal, which is generated by the microcircuit, is applied to a modulation network formed of a pair of series connected semiconductor switches and a light emitting element that is between the switches. As the ASK modulation signal enables one of the switches, the carrier signal activates the other switch to draw current through the first switch and the light emitting element. This then emits light at the desired carrier frequency at a magnitude that also is a function of the ASK modulation signal amplitude.

With an ASK transmitter circuit in accordance with one form of the invention, undesired sideband signals are suppressed by utilizing the input capacitance of the switch to which the ASK modulation signal is coupled. A low pass filter is formed with a series connected resistor to smooth the ASK modulation signal.

As described for particular embodiments of the invention, the switches are formed of mosfet devices with an N channel mosfet effectively directly connected to the oscillator carrier signal. The input capacitance of the N channel mosfet can be conveniently relied upon to provide the required tuning capacitance for the external oscillator circuit associated with the microcircuit used to produce the ASK modulation signal.

It is, therefore, an object of the invention to provide an ASK optical transmitter that is made of relatively few components. It is a further object of the invention to provide an ASK optical transmitter that is economical to produce, enables multiple use of circuit components, and provides ASK modulated optical carrier signals with relatively low sidebands.

These and other objects and advantages of the invention can be understood from the following description of a preferred embodiment as shown in the drawings.

BRIEF DESCRIPTION OF DRAWINGS

FIG. 1 is a schematic view of a preferred form of an optical transmitter in accordance with the invention;

FIG. 2 is a partial schematic representation of an alternate embodiment for an ASK transmitter in accordance with the invention; and FIG. 3 is a partial schematic representation of another embodiment for an ASK optical transmitter in accordance with the invention.

DETAILED DESCRIPTION OF DRAWINGS with reference to FIG. 1, an optical ASK transmitter 10 is shown for use as a transmitter of a prescribed digital code at regular intervals. Such transmitter is particularly effective for sending information of the identity of a person or an object to a receiver to enable a base unit to determine the location of the transmission such as in a building. The code in this instance is a fixed binary code that is repeated from memory at regular intervals from a device worn by a person or attached to portable equipment. The invention, however, is not intended to be limited to a fixed code and could accommodate a variable transmission such as digitized speech, etc.

The transmitter 10 includes a controller microcircuit 12 with which the fixed binary code is generated and a desired amplitude-shift-keyed modulation (ASK) signal is produced on output terminal 14. Techniques for producing an ASK modulation signal are well known and typically result in the presence of a pulse representing either a binary one or zero and the absence of a pulse representing the other binary digit.

The microcircuit 10 is powered from a DC source, which can be a power supply or a suitable battery 16 for portability, and requires a clock oscillator 18. As is typical for such microcircuit, the designer has a choice of selecting the operating frequency by attaching external oscillator components such as a crystal resonator 20 and tuning capacitors 22 and 24 connected to the terminals 26, 26' of the resonator 20. Internal oscillator components include an amplifier such as 28 and such other devices as are typically employed. A bypass capacitor 29 is connected across the DC source 16.

The oscillator 18 in accordance with the invention is selected at a frequency that is also compatible for use as an optical carrier signal for transmitter 10. This is achieved by applying the oscillator signal present on terminal 26 to the gate 30 of an N channel mosfet device 32. The power terminals, 34, for the source, and 36, for the drain, are connected in series with the power terminals 38 (source) and 40 (drain) of a P channel mosfet 42. One or more infrared LED (light emitting diodes) 44.1 and 44.2 are connected between drains 36 and 40 of mosfets 32 and 42 respectively.

One LED 44 could be used, though in practice, a plurality are employed for more light output and for transmission in various directions.

The gate 46 of P channel mosfet 42 is connected to the ASK terminal 14 through a resistance 50. This, together with the input capacitance 52 of gate 46, provide a smoothing of the leading and trailing edges of the ASK modulation signal on terminal 14. This also smoothes the ASK optical modulation envelope to prevent unwanted sidebands and reduce higher harmonics.

The tuning of resonator 20 relies upon the capacitance 22 and the input capacitance 24 of gate 30 of N channel mosfet 32. The frequency of the oscillator signal that is applied as a carrier signal to gate 30 is preferably selected at 455 KHz so as to be compatible with commonly available circuits.

In the operation of the optical transmitter 10, the carrier signal at gate 30 drives the N channel mosfet 32 into and out of conduction at the carrier frequency. Whether current is drawn through the series connected LED's 44 depends upon whether the P channel mosfet 42 is rendered in the conductive state by the ASK modulation signal. The P channel mosfet 42 thus operates as a "soft" switch which modulates the amplitude of the carrier pulses driving the infrared LED's 44.

In FIG. 2, the P mosfet 42 is replaced with an N-channel mosfet 60 that has its power terminals 62 for the source; and 64, the drain, connected between the drain 36 of mosfet 32 and the cathode 66 of LED 44.1. The gate 68 of mosfet 60 is coupled by resister 50 to ASK modulation port 14.

Since the soft switch represented by an N channel mosfet 60 requires an oppositely-phased ASK modulation signal from the P channel mosfet 42 in FIG. 1, an inversion of the ASK modulation is obtained at output 14. This can be done with an inverter as suggested at 70, but preferably is done with appropriate software changes in microcircuit 20.

In FIG. 3 still another ASK infrared transmitter circuit 80 is shown. In this circuit the ASK modulation signal at output port 14 is connected to an input 82 of AND gate 84 interposed between port 26 carrying clock pulses and gate 30 of N channel mosfet 32. The output 86 of AND gate 84 is coupled to gate 30. Since the stray capacitance of the gate of N channel mosfet 30 is not available for tuning clock circuit 18, a capacitor 88 from terminal 26 to ground is added. Whenever there is a pulse present on the output 14, gate 84 is enabled and carrier clock pulses present on terminal 26 are permitted to pass through AND gate 84 to activate N channel mosfet 32 and produce infrared carrier signals from LED's 44.

Having thus described an optical transmitter in accordance with the invention, its advantages can be appreciated. Variations can be made to the illustrated embodiment without departing from the scope of the invention. For example, transistors instead of mosfet devices could be used. Since transistors do not normally exhibit a high input impedance, special additional buffers may be needed to utilize the resonator output signals.

What is claimed is:

1. An amplitude-shift-keyed (ASK) optical transmitter for producing ASK modulated light signals and wherein a DC source powers a microcircuit to generate an ASK modulation signal on an output terminal and wherein an oscillator signal is used to operate the circuit, comprising:
   a light emitting semiconductor element;
   first and second semiconductor switches connected in series relationship with the light emitting element located therebetween and effectively across the DC source; said semiconductor switches each having an activating gate to render the switches conducting or non-conducting as a function of a voltage applied to their respective gates;
   means for coupling the ASK modulation signal at the output terminal to the gate of the first switch;
   means for coupling the oscillator signal to the gate of the second switch to turn the latter switch on and off at a rate commensurate with a desired carrier frequency;
   whereby, when said ASK modulation signal renders the first switch conductive, the light emitting element produces light signals at said carrier frequency and when said first switch is rendered non-conductive by said ASK modulation signal no light is emitted by the element.

2. The ASK transmitter as claimed in claim 1 wherein said first and second switches are formed of mosfet devices.

3. The ASK transmitter as claimed in claim 2 wherein said first switch is a P channel mosfet device and said second switch is an N channel mosfet device.

4. The ASK transmitter as claimed in claim 1 wherein said gate of said first switch has an input capacitance and wherein said ASK modulation signal coupling means includes a resistor whose resistance is selected commensurate with the input capacitance to sufficiently smooth the modulation envelope of the ASK modulation signal to prevent the generation of unwanted sidebands in the ASK modulated light signals.

5. The ASK transmitter as claimed in claim 4 wherein the gate of said second switch has an input capacitance, and further comprising external oscillator components including a resonator having one terminal effectively directly coupled to the gate of said second switch to include said latter input capacitance as part of the oscillator components.

6. An amplitude-shift-keyed (ASK) optical transmitter for producing ASK modulated light signals and wherein a DC source powers a microcircuit to generate an ASK modulation signal on an output terminal and wherein external oscillator components are connected to the microcircuit to select the operating frequency for a clock signal used to operate the microcircuit, comprising:
   a light emitting diode;
   an N channel mosfet having a gate, a source and a drain, said gate being connected to the clock signal;
   a P channel mosfet having a gate, a source and a drain, a smoothing element connecting the microcircuit terminal on which the ASK signal is generated to the gate of the P channel mosfet;
   said light emitting diode being connected between the drains of said P and N channel mosfets, and with said sources of the P and N channel mosfets being effectively connected across the DC source; and
   wherein said oscillator components generate a clock signal at a frequency that can serve as a carrier signal so that light from the light emitting diode has an ASK modulated envelope at the frequency of the carrier signal.

7. The ASK transmitter as claimed in claim 6 wherein the gate of said P channel mosfet has an input capacitance, and said smoothing element is a resistor, which with said input capacitance sufficiently smoothes the ASK modulation signal to reduce undesired sidebands from said ASK modulated light emitting diode.

8. An amplitude-shift-keyed (ASK) optical transmitter for producing ASK modulated light signals and wherein a DC source powers a microcircuit to generate an ASK modulation signal on an output terminal and wherein an oscillator signal is used to operate the circuit, comprising:
   a light emitting semiconductor element;
   first and second semiconductor switches connected in series relationship with and to one side of, the light-emitting element and with the light element effectively connected across the DC source;
   said semiconductor switches, each having an activating gate to render the switches conducting or non-conducting as a function of a voltage applied to their respective gates;
   means for coupling the ASK modulation signal at the output terminal to the gate of the first switch;
   means for coupling the oscillator signal to the gate of the second switch to turn the latter switch on and off at a rate commensurate with a desired carrier frequency;

whereby, when said ASK modulation signal renders the first switch conductive, the light emitting element produces light signals at said carrier frequency and when said first switch is rendered non-conductive by said ASK modulation signal no light is emitted by the element.

9. The ASK transmitter as claimed in claim 8 wherein said first and second switches are formed of mosfet devices.

10. The ASK transmitter as claimed in claim 9 wherein said switches are N channel mosfet devices.

11. The ASK transmitter as claimed in claim 8 wherein said gate of said first switch has an input capacitance and wherein said ASK modulation signal coupling means includes a resistor whose resistance is selected commensurate with the input capacitance to sufficiently smooth the modulation envelope of the ASK modulation signal to prevent the generation of unwanted sidebands in the ASK modulated light signals.

12. The ASK transmitter as claimed in claim 8 wherein the gate of said second switch has an input capacitance, and further comprising external oscillator components including a resonator having one terminal effectively directly coupled to the gate of said second switch to include said latter input capacitance as part of the oscillator components.

13. An amplitude-shift-keyed (ASK) optical transmitter for producing ASK modulated light signals and wherein a DC source powers a microcircuit to generate an ASK modulation signal on an output terminal and wherein an oscillator signal is used to operate the circuit, comprising:

a light emitting semiconductor element;

a semiconductor switch connected in series relationship with the light emitting element and with the light element effectively coupled across the DC source; said semiconductor switch having an activating gate to render the switch conducting or non-conducting as a function of a voltage applied to said gate;

AND gate means having a first input coupled to the ASK modulation signal and having a second input coupled to the oscillator signal and having an output coupled to the gate of the switch for rendering said switch conductive at a frequency of the osillator signal when the ASK modulation signal is in an enabling state;

whereby, when said ASK modulation signal enables the AND gate means the light emitting element produces light signals at said oscillator frequency and when said AND gate means is disabled by said ASK modulation signal no light is emitted by the element.

14. The ASK transmitter as claimed in claim 13 and further comprising means for generating said oscillator signal at a desired carries frequency to produce light from said element at said carrier rate.

15. The ASK transmitter as claimed in claim 13 wherein said switch is an N channel mosfet.

* * * * *